(12) United States Patent
Shehane et al.

(10) Patent No.: US 6,975,317 B2
(45) Date of Patent: Dec. 13, 2005

(54) METHOD FOR REDUCTION OF POSSIBLE RENDERABLE GRAPHICS PRIMITIVE SHAPES FOR RASTERIZATION

(75) Inventors: Patrick Shehane, Fremont, CA (US); Michael G. Lavelle, Saratoga, CA (US); Mark E. Pascual, San Jose, CA (US); Wing-Cheong Tang, Union City, CA (US); Nandini Ramani, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 252 days.

(21) Appl. No.: 10/096,090

(22) Filed: Mar. 12, 2002

(65) Prior Publication Data

US 2003/0174133 A1 Sep. 18, 2003

(51) Int. Cl.[7] ............................................. G06T 15/40
(52) U.S. Cl. ........................ 345/421; 345/426; 345/581; 345/582; 345/613; 345/506; 345/441
(58) Field of Search ................................. 345/426, 441, 345/613, 582, 423, 506, 421, 581

(56) References Cited

U.S. PATENT DOCUMENTS

| | | | | |
|---|---|---|---|---|
| 6,034,699 A | * | 3/2000 | Wong et al. ................. | 345/441 |
| 6,094,201 A | * | 7/2000 | Malamy et al. ............. | 345/441 |
| 6,424,343 B1 | | 7/2002 | Deering et al. | |
| 6,624,823 B2 | * | 9/2003 | Deering ...................... | 345/613 |

FOREIGN PATENT DOCUMENTS

WO      WO 99/41706      8/1999

* cited by examiner

Primary Examiner—Kimbinh T. Nguyen
(74) Attorney, Agent, or Firm—Meyertons Hood Kivlin Kowert & Goetzel, P.C.; Jeffrey C. Hood

(57) ABSTRACT

A graphics system and method for rendering a plurality of triangles. Information regarding the triangle may first be received. The method may then determine the longest edge or major edge of the triangle and also determine the direction or axis of the longest edge of the triangle. The method may then perform edge walking on the major edge (e.g., along the axis of the major edge) of the triangle, followed by span walking. The edge walking is preferably always performed on the major or longest edge of the triangle, prior to the span walking, and regardless of the orientation of the major edge of the triangle. This operates to load balance the edge walker and the span walker for the plurality of triangles.

18 Claims, 13 Drawing Sheets

METHOD FOR REDUCTION OF POSSIBLE RENDERABLE GRAPHICS PRIMITIVE SHAPES FOR RASTERIZATION

BACKGROUND OF THE INVENTION

1. Field of the Invention

This invention relates generally to the field of computer graphics and, more particularly, to rendering polygons such as triangles.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modern graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from converters is conveyed to a display device such as a computer monitor, LCD display, or projector.

As noted above, the rendering process may include interpolating slopes of edges of the polygon or triangle, and then calculating pixels or samples based on these interpolated slopes. One problem that arises is that a graphics system typically When rasterizing a triangle, there are two major accumulations (or "walking") required. The first accumulation (referred to as "edge walking") comprises the "slicing" of the triangle into spans or slices while traversing an edge. The input to the edge walker or the first accumulator is the initial starting and ending points of the triangle and the slopes of each edge. While stepping along the edge, the edge walker generates the "slices" or "spans" which may be the start and end points for each slice (e.g., a scan line). These slices are the input to the second major accumulator, referred to as the "span walker". The second accumulator or span walker "walks" the slice, generating the pixels that will eventually be stored in the frame buffer.

The size and shape of the triangle being rendered generally affects the work required to be performed by edge and span walkers. For example, if the triangle is mostly vertical, and if the first accumulator (edge walker) always accumulates left to right, then the second accumulator (span walker) will have a greater workload than the edge walker. This leaves the edge walker under utilized. If the triangle is mostly horizontal, then the edge walker will have an increased workload, but this increased workload may still be comparable to the span walker. This is because, in general, the span walking process is more time intensive than the edge walking process. Thus, with a random mixture of triangle shapes (including both horizontal and vertical triangles), the edge walker will typically be less utilized than the span walker.

Therefore, an improved system and method is desired for rendering polygons, such as triangles, with increased performance. A system and method is also desired for increasing the effective utilization of the span and edge walkers and removing bottlenecks in graphics rendering operations.

SUMMARY OF THE INVENTION

One embodiment of the present invention comprises a graphics system and method for rendering a plurality of triangles. The plurality of triangles may correspond to an image rendered on a display, and the method may be performed for each of the plurality of triangles, or for a substantial majority of the triangles.

The method may comprise receiving information regarding the triangle, such as vertex information describing position, color and other parameters of the vertices. The position information may comprise x, y coordinates of the vertices of the triangle. The method may then determine the longest edge of the triangle, e.g., the major edge of the triangle. The method may also determine the direction or axis of the longest edge of the triangle. The method may then operate on the major edge (e.g., along the axis of the major edge) of the triangle to generate start and end points on the major edge and at least one complementary edge of the triangle. The start and end points may define respective spans (or "slices") encompassed by the triangle. As one example, an edge walking unit may perform an "edge walking" function to traverse the major edge and generate the start and end points. The method may then identify pixel locations in the spans of the triangle based on the start and end points. As one example, a span walking unit may perform a "span walking" operation to generate colors at pixel locations in the spans determined by the edge walker.

The edge walking is preferably always performed on the major or longest edge of the triangle, prior to the span walking, and regardless of the orientation of the major edge of the triangle. This operates to load balance the edge walker and the span walker for the plurality of triangles. In other words, since the edge walker is typically less burdened than the span walker for triangles with a random sampling of orientations, one embodiment of the invention operates to effectively change the orientation of certain of the triangles so that the edge walker always operates on the major or longest edge of each triangle. This increases the workload of the edge walker, and thus may operate to provide more of a balance between the workload of the edge walker and span walker.

In one embodiment of the method, when the method determines a direction of the major edge of the triangle the method stores information regarding this direction in memory. The method then maps the x,y coordinates to a major, minor coordinate system having a "major" axis and a "minor" axis. The mapping may be performed based on the direction of the longest edge of the triangle, wherein the major axis of the major, minor coordinate system corresponds to the x,y axis of the longest or major edge of the triangle. For triangles that are mostly horizontal or x-major, the major, and where the edge walker operates in a left to right direction, the minor coordinate system is effectively the same as the x,y coordinate system. For triangles that are mostly vertical or y-major, this mapping effectively changes the orientation of the triangle to be mostly horizontal for the purposes of the edge walker.

The triangle may then be rasterized according to the major, minor coordinate system, wherein the rasterization begins along the major axis of the major, minor coordinate system. Thus the rasterization begins in the direction of the longest edge of the triangle regardless of the orientation of the major edge of the triangle. During the rasterization process, the edge walking process may be performed first along the major axis of the major, minor coordinate system. This effectively causes the edge walking process to always operate on the major edge of the triangle to generate start and end points, e.g., to preferably always perform the edge walking process along the major edge of the triangle. The span walking process may then be performed on spans which are along the minor axis of the major, minor coordinate system. After the edge walking and span walking operations, the coordinates of the triangle may then be mapped back to the x,y coordinates using the stored information regarding the direction of the longest edge of the triangle.

A graphics system for rendering a plurality of triangles may comprise an input for receiving information regarding the triangle; an edge walker that performs edge walking on a major edge of the triangle to generate start and end points on the major edge and at least one complementary edge of the triangle, wherein the start and end points define respective spans encompassed by the triangle; and a span walker that performs span walking on the triangle to identify pixel locations in the spans of the triangle based on the start and end points. As described above, the edge walker operates on the major edge of the triangle regardless of the orientation of the major edge of the triangle.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
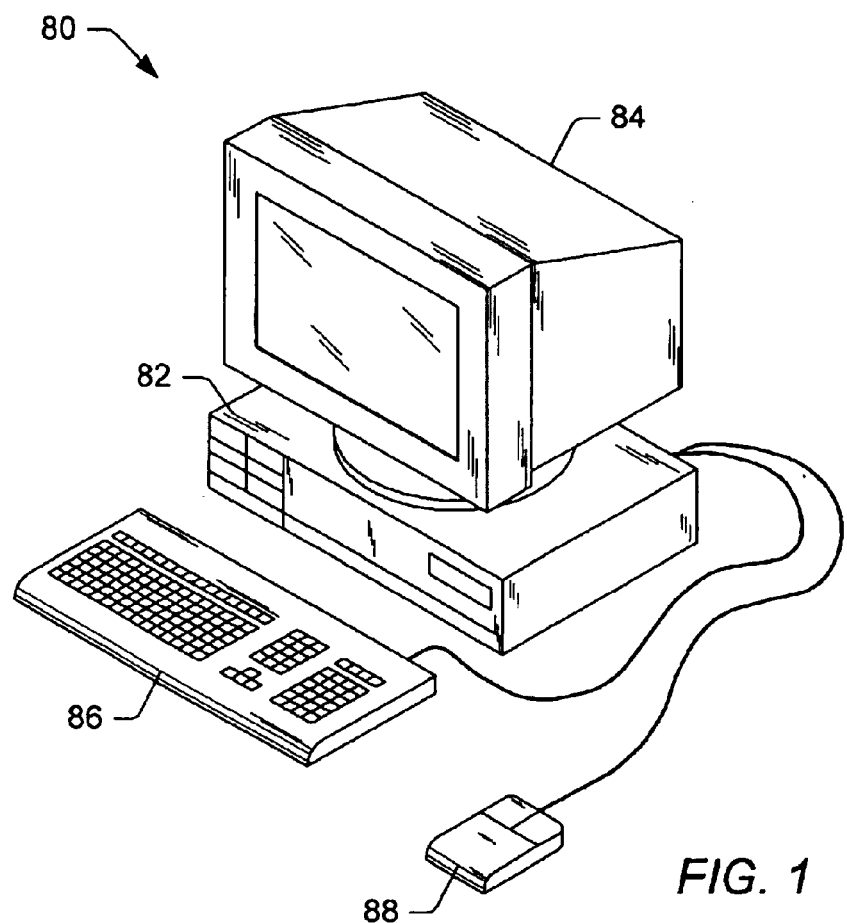
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE EMBODIMENTS

Incorporation by Reference

U.S. patent application Ser. No. 09/939,296 titled "Interpolating Sample Values from Known Triangle Vertex Values", and filed on Aug. 24, 2001, is hereby incorporated by reference as though fully and completely set forth herein.

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
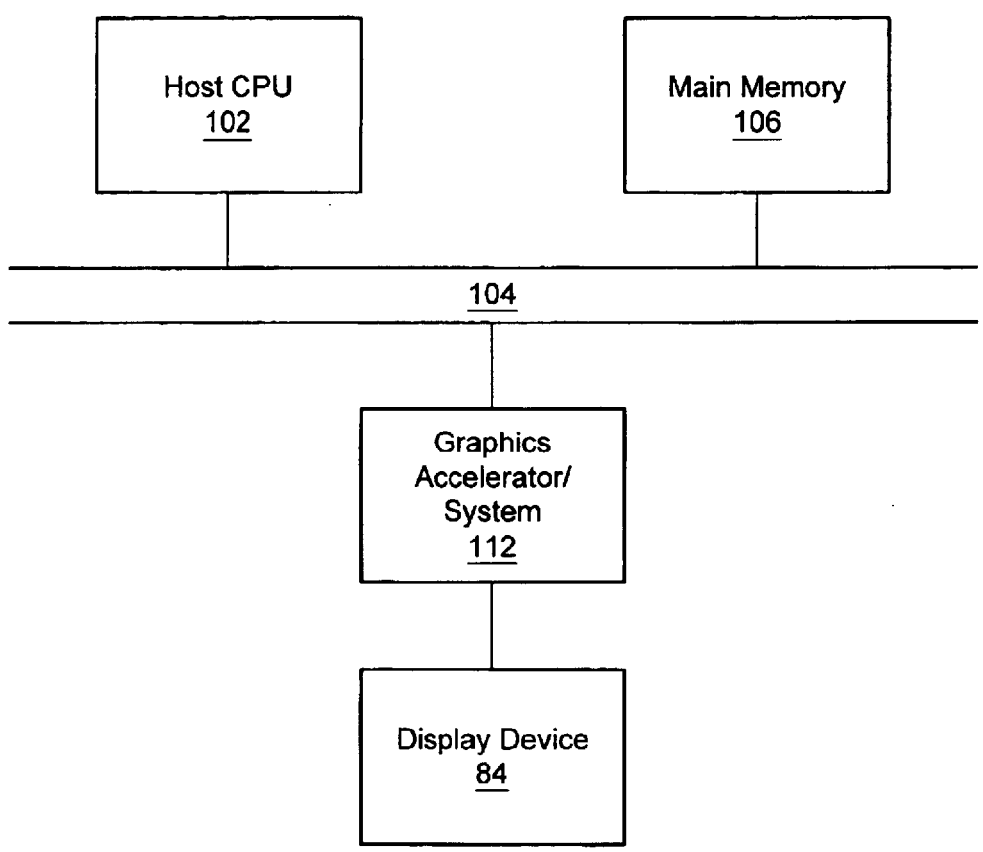
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
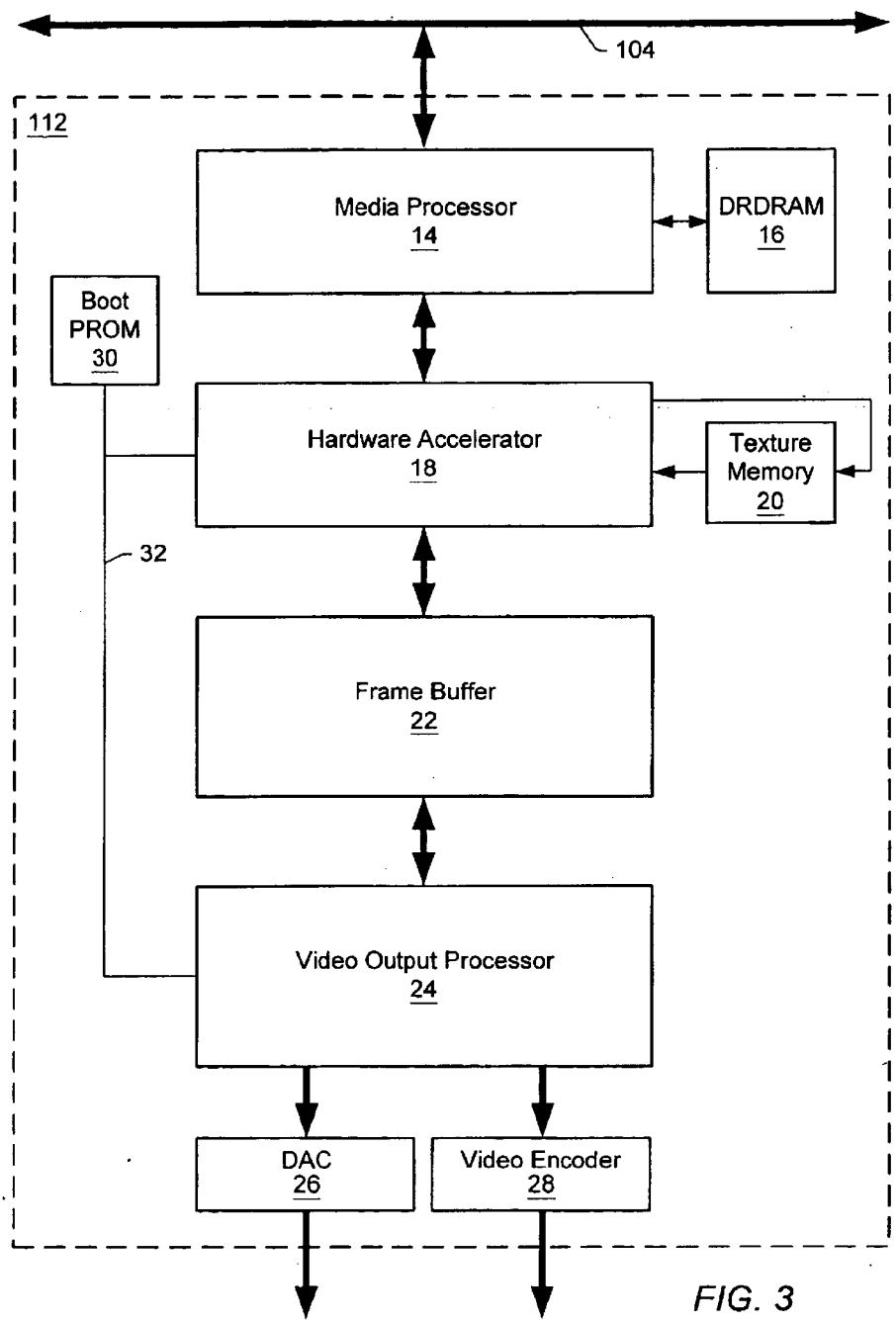
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
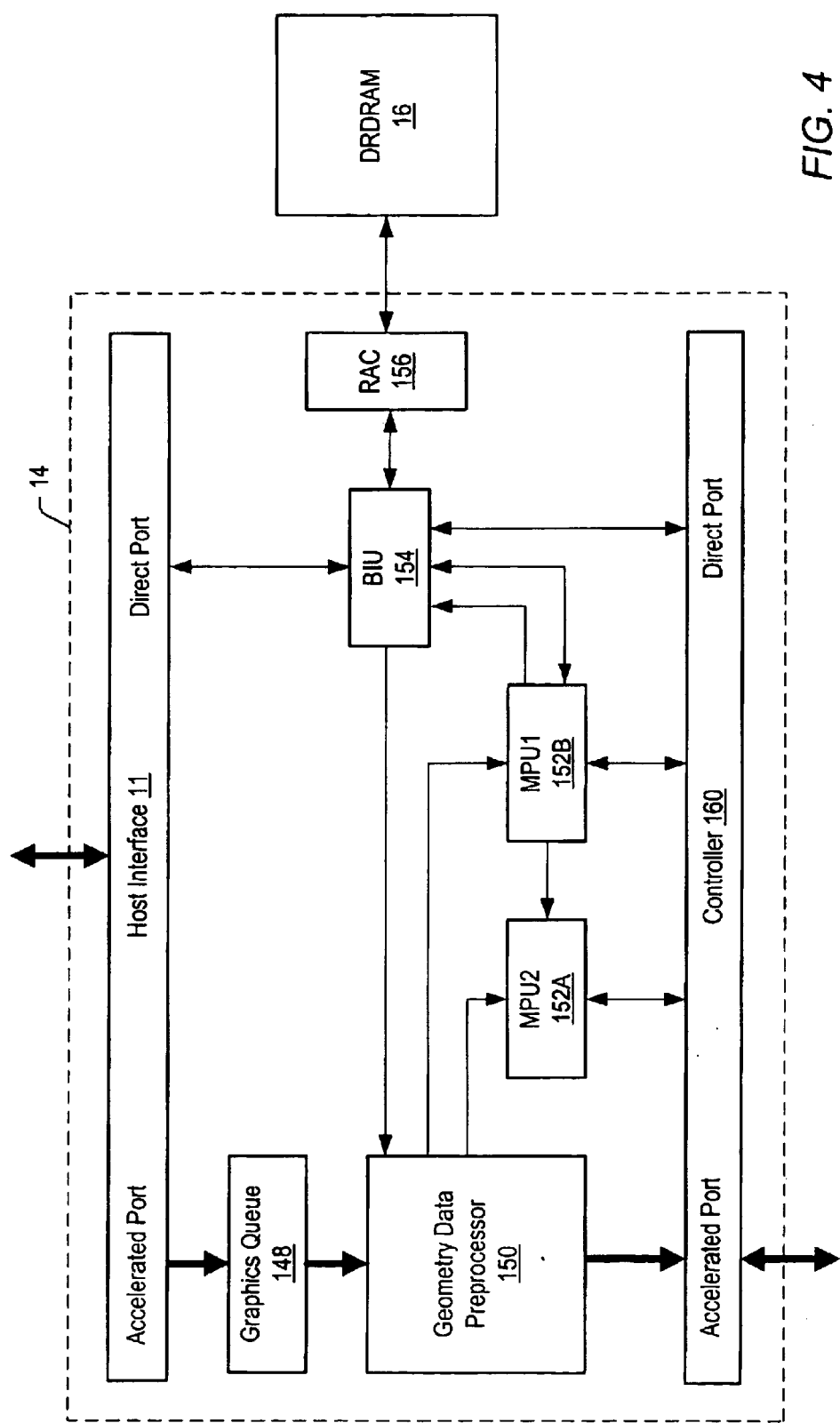
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappinga (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
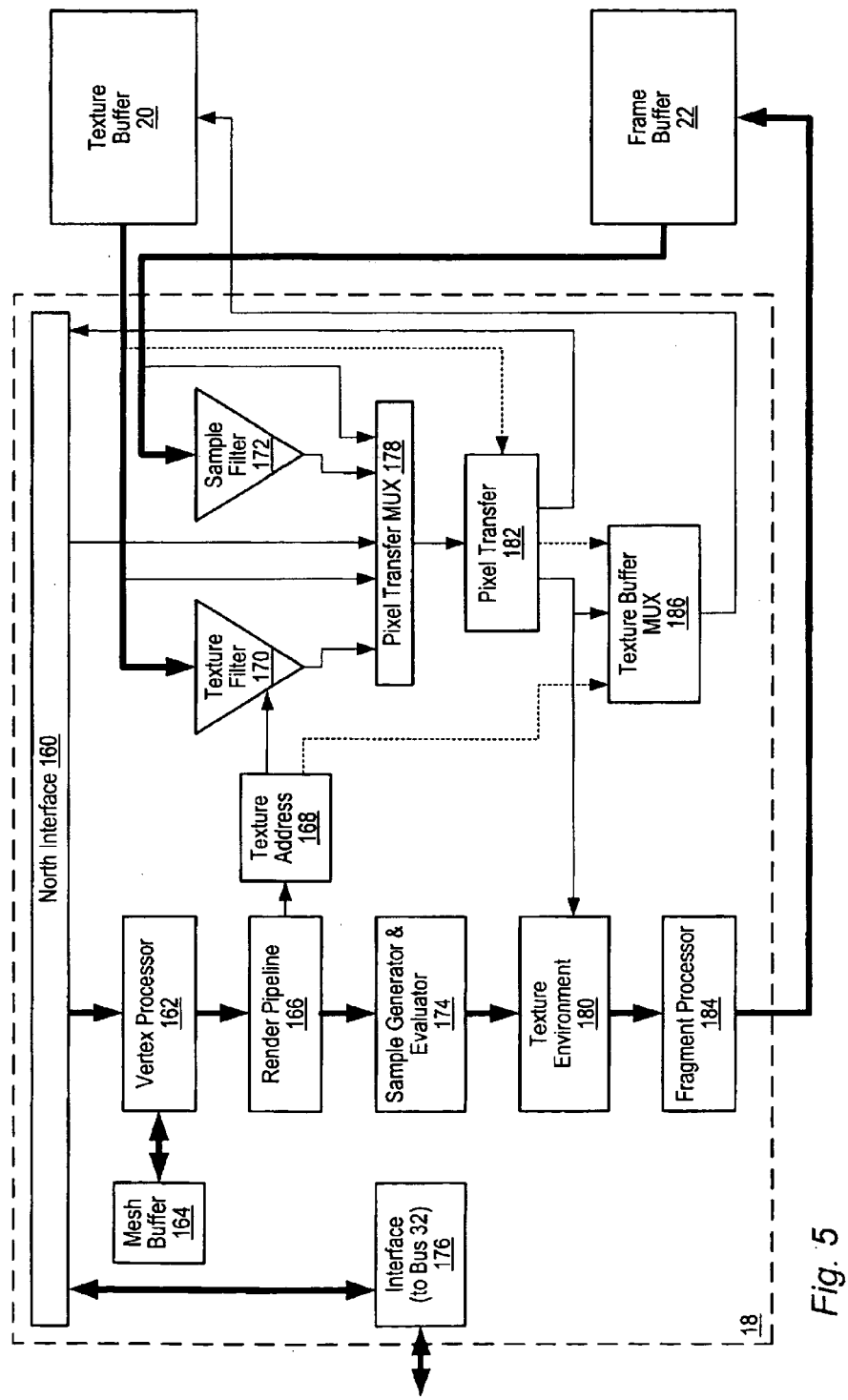
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3D-RAM memory devices (e.g. 3D-RAM64 memory devices) manufactured by Mitsubishi Electric Corporation. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and sample buffer.

Figure 6:
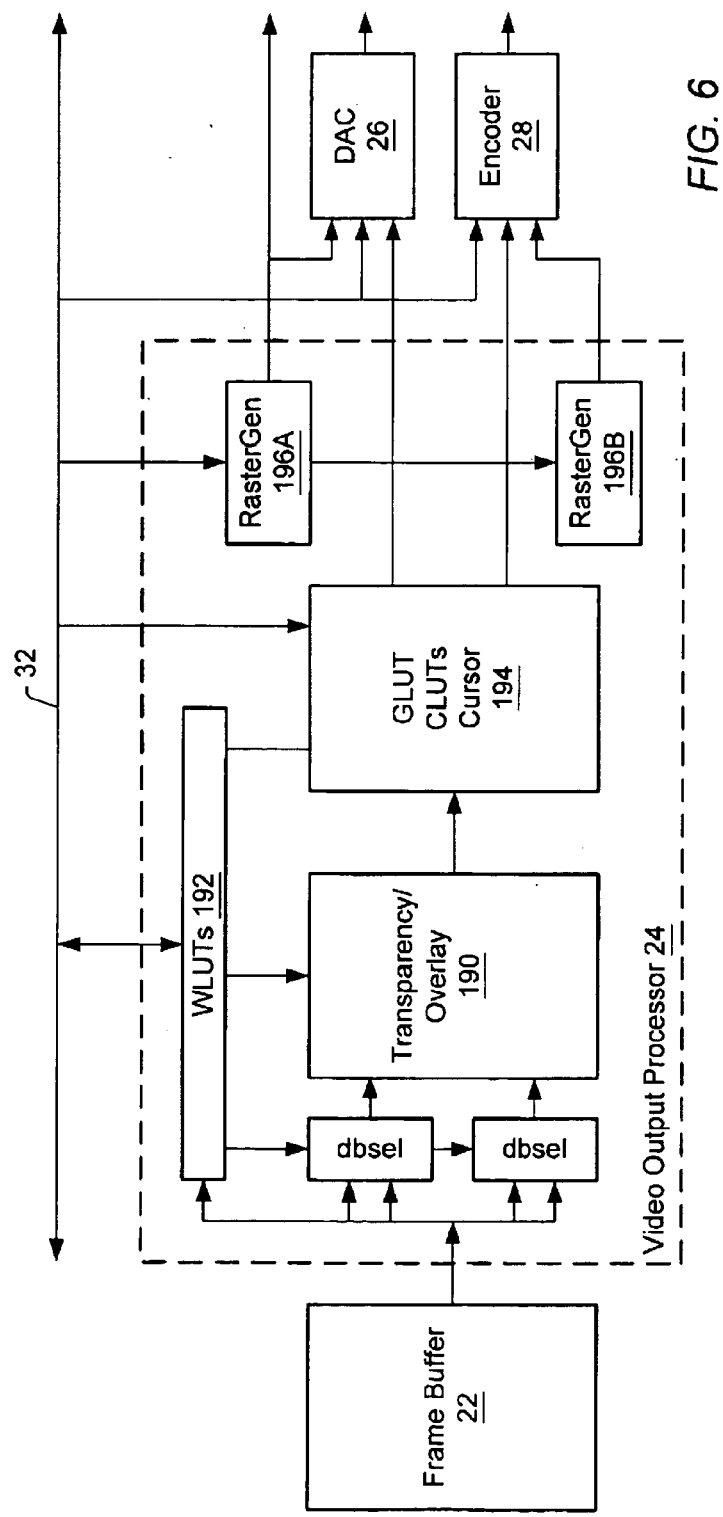
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
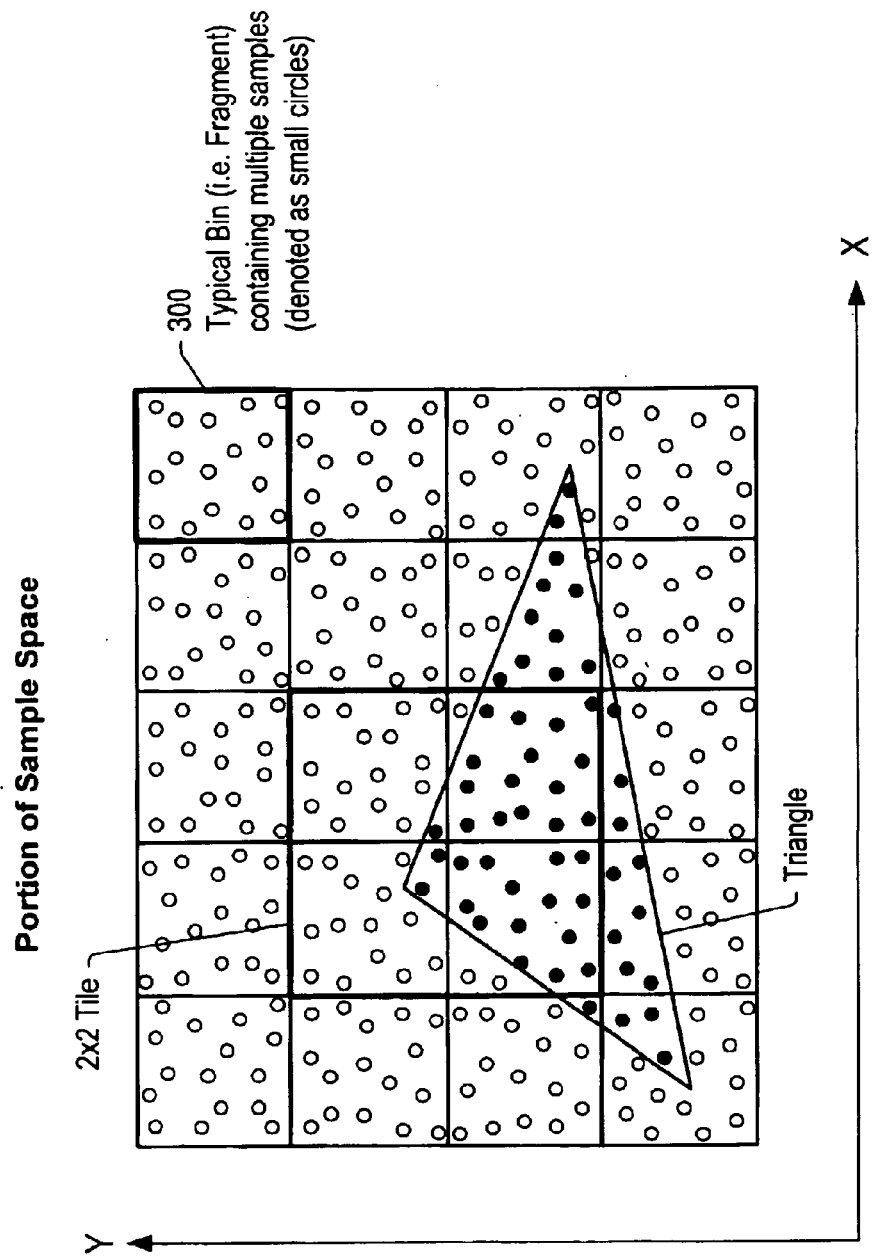
FIG. 7 illustrates rendering samples or pixels in a polygon, e.g., a triangle.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g. bin 300) as illustrated in FIG. 7. Each bin may contain one or more samples. The number of samples per bin may be a programmable parameter.

Figure 8:
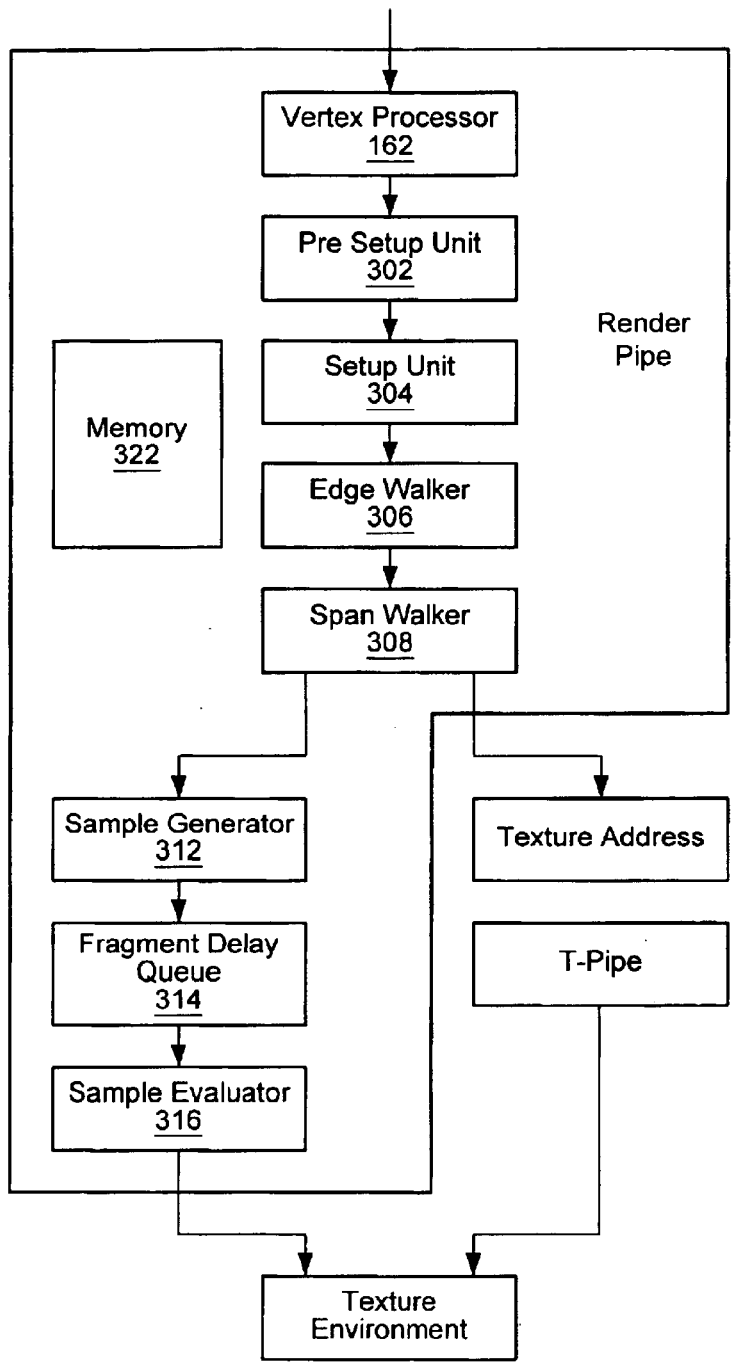
FIG. 8 is a more detailed block diagram of the render pipeline of FIG. 5.

FIG. 8—Render Pipeline

FIG. 8 illustrates a more detailed block diagram of one embodiment of the render system or render pipeline 166. As shown, the render pipeline 166 may comprise a Vertex Processor (VP) 162, a Pre-Setup Unit (PSU) 302, a Setup Unit (SU) 304, at least one Edge Walker (EW) 306, and at least one Span Walker (SW) 308. The render pipeline 166 may also comprise a Sample Generator (SG) 312, a Fragment Delay Queue (FDQ) 314, and a Sample Evaluator (SE) 316. The render pipeline 166 may also comprise a memory 322.

The Vertex Processor 162 operates to assemble the received vertices. The vertex information may be received from the host computer.

The Pre-Setup Unit 302 operates to pre-process vertex data.

The Setup Unit 304 operates to set up the triangle.

The Edge Walker 306 operates to interpolate along the controlling edge (or "major edge") of a polygon or triangle.

The Span Walker 308 operates to interpolate along the subordinate edges (or "complementary edges") of a polygon or triangle.

The Edge Walker 306 and Span Walker 308 may be referred to as "accumulators". The Edge Walker 306 preferably operates first to generate spans or slices that are then operated on by the Span Walker 308. As described further below, for each of a plurality (or all) of the triangles, the Edge Walker 306 preferably always operates on the major or longest edge of the triangle (in the direction of the major or longest edge), regardless of the orientation of the major edge of the triangle. This operates to load balance the Edge Walker 306 and the Span Walker 308 for the plurality of triangles.

The system shown in FIG. 8 may at least partially operate as follows. First, the vertex data (x,y,z,r,g,b . . . ) sent by the host computer is assembled in the VP 162. The SU 304 then sets up the triangle for rendering. This includes computing initial intercepts along each edge and the slope along each edge. The Edge Walker 306 interpolates the x,y and related component values along the controlling edge. The controlling edge is the edge with the max(abs(dx),abs(dy)). Thus, as described further below, the Edge Walker 306 preferably always operates on the longest or major edge of the triangle. For each span or slice issued by the Edge Walker 306, the Span Walker 308 interpolates from the controlling to the subordinate edges. Samples or pixels may then be generated and/or stored in the frame buffer.

Figure 9:
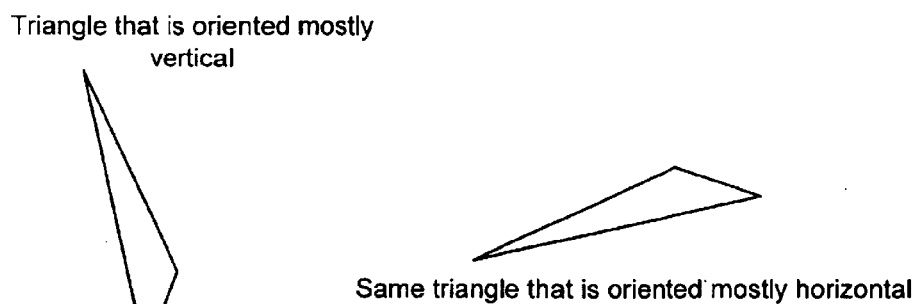
FIG. 9 illustrates a triangle oriented mostly vertical and the same triangle oriented mostly horizontal.

FIG. 9 illustrates a triangle that is oriented mostly vertically and the same triangle that is oriented mostly horizontally. As discussed in the background section, in general, the span walking process is more time intensive than the edge walking process. In addition, the workload for each of the Edge Walker 306 and the Span Walker 308 may depend on the orientation of the triangle, e.g., whether the triangle is mostly vertical or mostly horizontal.

For example, if the triangle is mostly vertical, and if the Edge Walker 306 always accumulates left to right, then the Span Walker 308 will have an even greater workload than the Edge Walker 306. This leaves the Edge Walker 306 underutilized. If the triangle is mostly horizontal, then the Edge Walker 306 will have an increased workload, but this increased workload may still only be comparable to the Span Walker 308. This is because, as noted above, the span walking process is more time intensive than the edge walking process. Thus, with a random mixture of triangle shapes, the Edge Walker 306 will typically be less utilized than the Span Walker 308. This may cause reduced performance in the graphics system.

Figure 10:
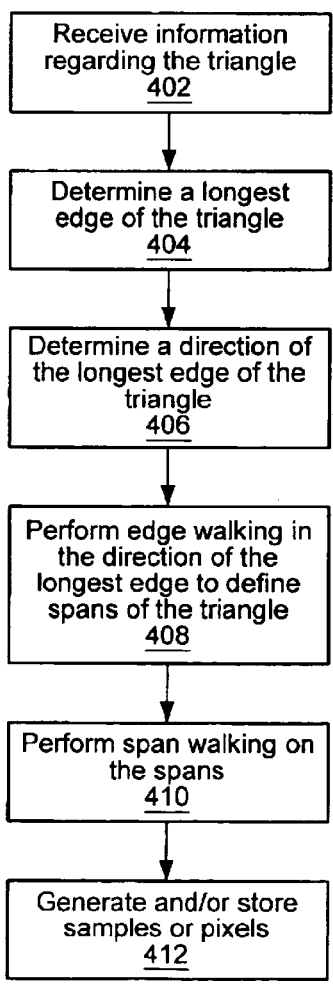
FIG. 10 is a flowchart diagram illustrating operation of one embodiment of the invention.

FIG. 10—Flowchart Diagram

FIG. 10 illustrates a method for rendering a triangle according to one embodiment of the invention.

In step 402 the graphics system receives information regarding a polygon, such as a triangle. For example, the graphics systems may receive vertex information or geometric primitive information describing parameters with respect to vertices of the triangle, including one or more of: position values, color values, normal values, alpha values, etc. The position information may include x,y position information specifying the position of each of the vertices of the triangle in an x,y coordinate system having x and y axes.

In step 404 the graphics system may determine the longest edge of the triangle. The longest edge in one embodiment may be the edge that has the maximum of the absolute value of dx and the maximum of the absolute value of dy. In another embodiment, the longest edge is the edge that has the maximum Euclidean distance. The longest edge may also be referred to as the "major" edge.

Figure 12:
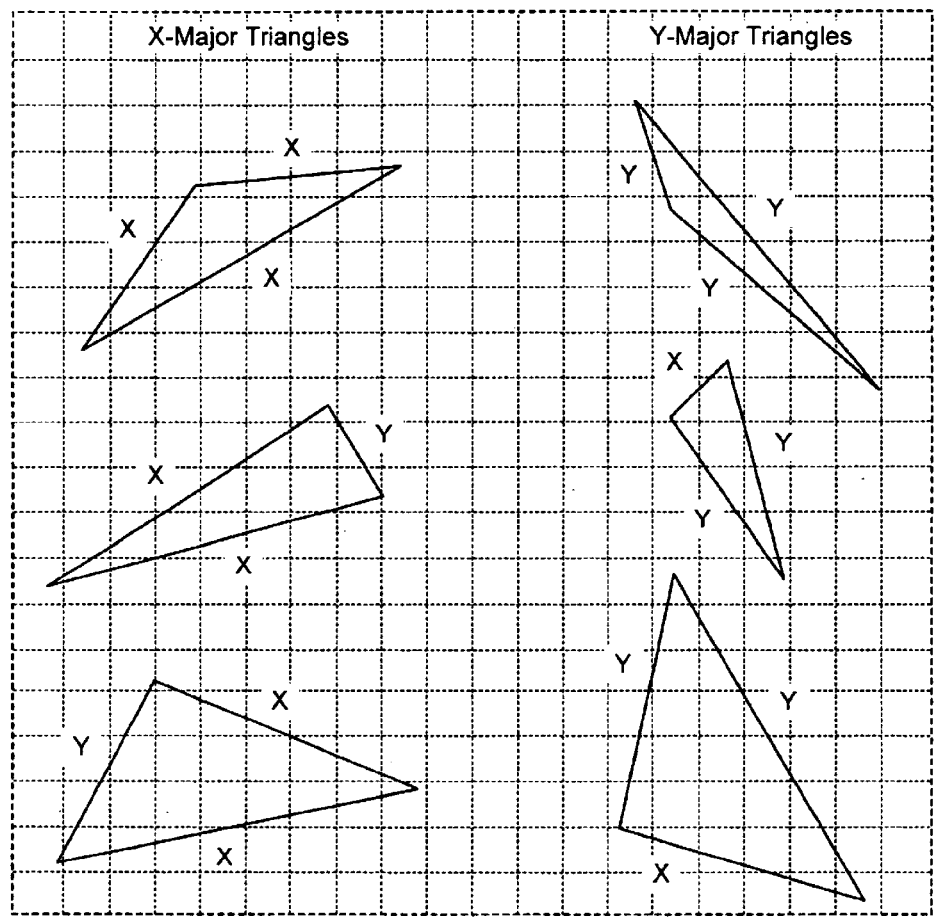
FIG. 12 illustrates examples of x-major and y-major triangles.

In step 406 the graphics system may determine the direction (or axis) of the longest edge, i.e., whether the direction is mostly vertical (up/down) or mostly horizontal (left/right). Exemplary x-major and y-major triangles are shown in FIG. 12. As shown, the x-major triangles (on the left of the figure) are mostly horizontal and thus have an x direction. The y-major triangles (on the right of the figure) are mostly vertical and thus have a y direction.

One or more of the Setup unit 304, Pre Setup unit 302 or vertex processor 162 may perform steps 404 and 406. First, the graphics system performs calculations to determine the length of all the edges. After this, the graphics system may identify the longest edge in step 404. The graphics system may also determine the orientation of the longest edge in step 406. In one embodiment, the graphics system first computes x, y deltas (dx, dy) along all three edges of the triangle. The graphics system then computes reciprocals of dx and dy (Dx, Dy). Then, using dx and dy, the graphics system may find the major dimension of each edge. Then the graphics system may find the controlling edge, which may also be the longest edge. The major dimension of the controlling edge is the major dimension of the triangle. The vertices may then be sorted along the major and minor dimensions of the triangle.

Figure 13:
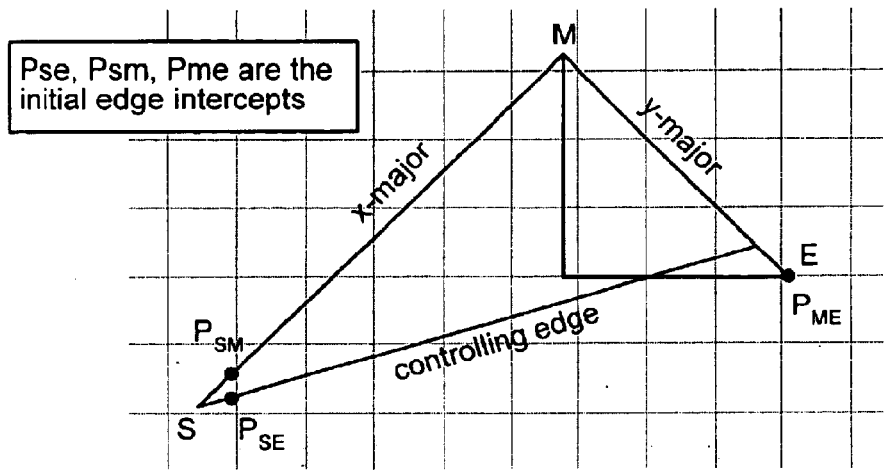
FIG. 13 illustrates an exemplary x-major triangle.
Figure 14:
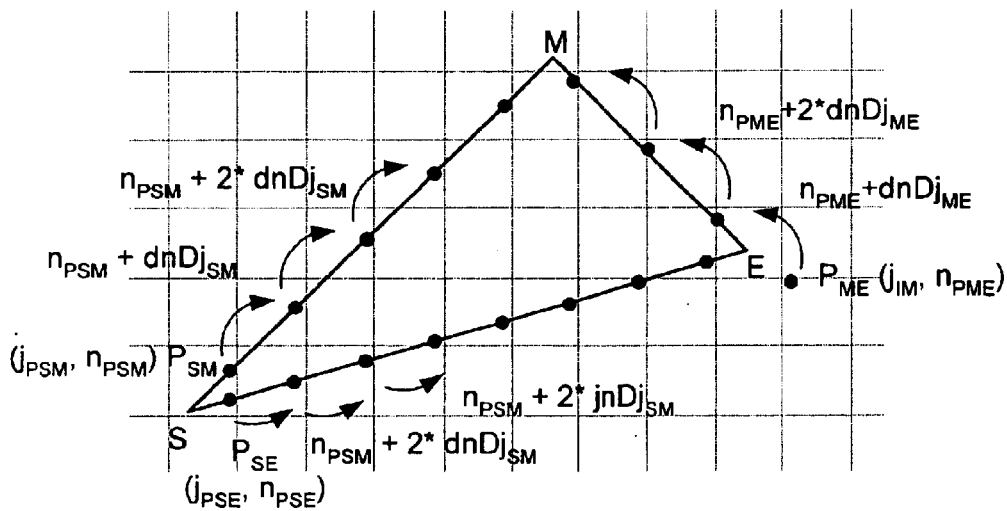
FIG. 14 illustrates an example of edge walking the triangle of FIG. 13.

In step 408 the graphics system may then operate on the major edge (e.g., along the axis of the major edge) of the triangle to generate start and end points on the major edge and at least one complementary edge of the triangle. The start and end points may define respective spans (or "slices") encompassed by the triangle. As one example, the edge walking unit 306 may perform an "edge walking" function to traverse the major edge and generate the start and end points. FIG. 13 illustrates an exemplary x-major triangle. FIG. 14 illustrates an example of edge walking the triangle of FIG. 13. As shown, the edge walking may generate start points on the edge referred to as "controlling edge" in FIG. 13, and may generate end points on the complementary edges referred to as "x-major" and "y-major" in FIG. 13. These start and end points define vertical spans or slices in the triangle, as designated by the dotted lines in FIG. 14.

Figure 15:
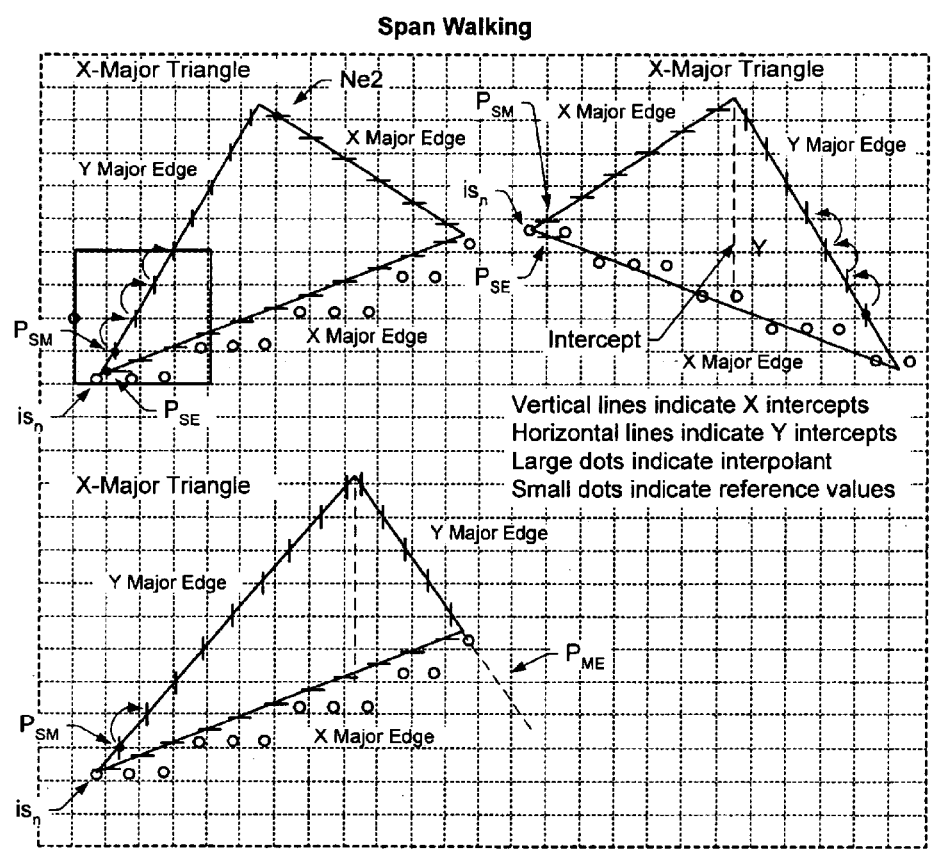
FIG. 15 illustrates an example of span walking various exemplary triangles.

In step 410 the graphics system may then identify pixel locations in the spans or slices of the triangle based on the start and end points determined in step 408. As one example, the span walking unit 308 may perform a "span walking" operation to generate colors at pixel locations in the spans determined by the Edge Walker 306. The span walking in step 410 may be performed at least partially concurrently (e.g., in a pipelined fashion) with the edge walking in step 408, it being understood that the Edge Walker 306 first generates start and end points defining the spans that then may be traversed by the Span Walker 308. FIG. 15 illustrates an example of span walking various exemplary triangles.

The edge walking in step 408 is preferably always performed on (in the direction of) the major or longest edge of the triangle regardless of the orientation of the major edge of the triangle. This operates to load balance the Edge Walker 306 and the Span Walker 308 for the plurality of triangles. In other words, since the Edge Walker 306 is typically less burdened than the Span Walker 308 for triangles with a varied sampling of orientations, one embodiment of the invention operates to effectively change the orientation of certain of the triangles so that the Edge Walker 306 always operates on the major or longest edge of each triangle. This increases the workload of the Edge Walker 306 relative to the Span Walker 308 (i.e., increases the workload of the Edge Walker 306 and decreases the workload of the Span Walker 308), and thus may operate to provide more of a balance between the workload of the Edge Walker 306 and Span Walker 308. In one embodiment, as a result of the method described herein, the Edge Walker 306 and Span Walker 308 have substantially similar workloads, and thus neither is waiting on the other and/or neither is underutilized. This improves performance in the graphics system.

In step 412, the graphics system may generate and/or store samples or pixels at least partially based on the computations performed in steps 408 and 410. The samples and/or pixels may then be used to render an image on the display.

The above method is preferably performed for each of a plurality of triangles defining an image.

Figure 11:
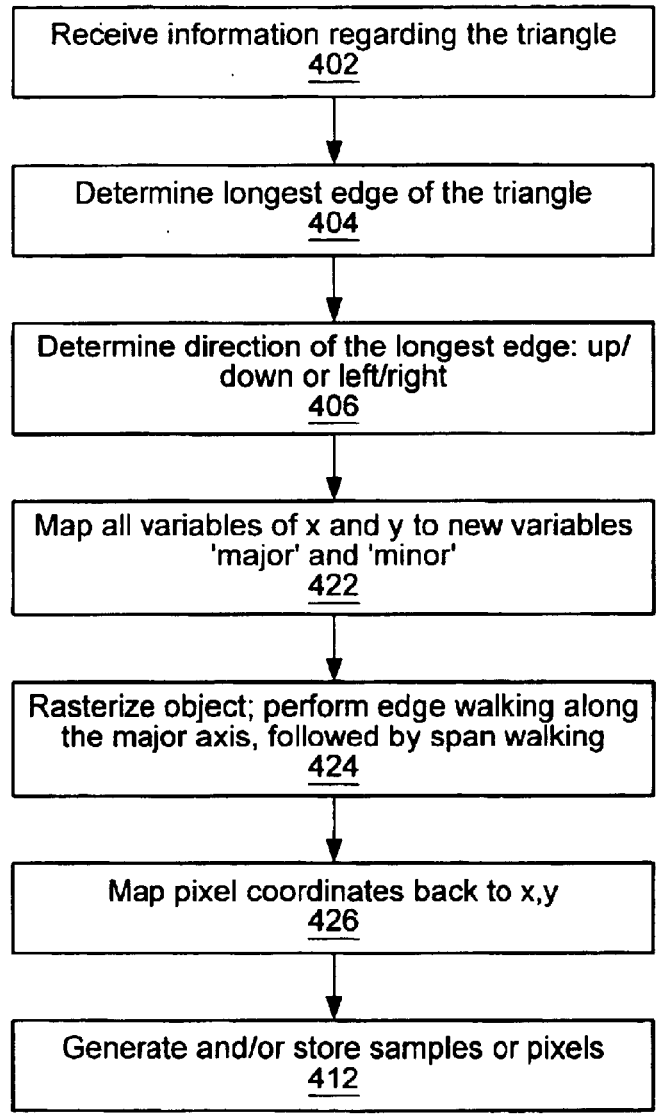
FIG. 11 is a flowchart diagram illustrating operation of another embodiment of the invention.

FIG. 11 illustrates an alternate embodiment of the method of the present invention. As shown, after the graphics system determines the direction (or axis) of the longest edge of the triangle in 406, the graphics system stores information regarding this direction in memory, such as memory 322. This information may be preserved for use later when pixels (or samples) are written out to the frame buffer.

After step 406, in step 422 the graphics system may operate to map the x,y coordinates of the triangle to new coordinates or variables referred to as "major" and "minor", e.g., maps the x,y coordinates of the triangle to a major, minor coordinate system having a "major" axis and a "minor" axis. The mapping may be performed based on the direction of the longest edge of the triangle, wherein the major axis of the major, minor coordinate system corresponds to either the x or y axis that corresponds to the longest or major edge of the triangle. For triangles that are mostly horizontal or x-major, and where the Edge Walker 306 operates in a left to right direction, the major, minor coordinate system is effectively the same as the x,y coordinate system. For triangles that are mostly vertical or y-major, this mapping effectively changes the orientation of the triangle to be mostly horizontal for the purposes of the Edge Walker 306.

This mapping effectively operates to take the orientation out of the accumulation calculations, thereby simplifying the calculations, reducing the total number of possible shapes, and improving performance.

In step 424 the graphics system may then rasterize the triangle. Step 424 may include steps 408 and 410. The triangle may be rasterized according to the major, minor coordinate system, wherein the rasterization begins along the major axis of the major, minor coordinate system. Thus the rasterization begins in the direction of the longest edge of the triangle, regardless of the orientation of the major edge of the triangle. During the rasterization process, the edge walking process may be performed first along the major axis of the major, minor coordinate system. This effectively causes the edge walking process to always operate on the major edge of the triangle to generate start and end points, e.g., to preferably always perform the edge walking process along the major edge of the triangle. The span walking process may then be performed on spans or slices which are in the direction perpendicular to the major orientation of the triangle. After the edge walking and span walking operations, the coordinates of the triangle may then be mapped back to the x,y coordinates using the stored information regarding the direction of the longest edge of the triangle.

After the triangle has been rasterized, the method may then map the pixel coordinates (in the major, minor coordinate system) back into x, y coordinates so that the pixels may then be written into the frame buffer properly.

Therefore, in summary, in one embodiment the method effectively "influences" the orientation of the triangle so that the average triangle may spend approximately comparable or equal time in both accumulators, i.e., in the Edge Walker 306 and Span Walker 308. In one embodiment, the amount of time spent by the two accumulators in analyzing a triangle may be made more comparable using the method described herein, although the amount of time spent in each still may not be substantially equal.

In summary, the orientation of the triangle may be influenced as follows. First, in the setting up of the triangle, calculations are performed to determine the length of all the edges. After that, the longest edge is identified, and the general orientation of the longest edge is determined. Information regarding the orientation of the longest edge may be preserved for use when writing the pixels out to the frame buffer. For example, if the longest edge is mostly horizontal, then the triangle can be considered as "x-major" and "y-minor". If the longest edge is mostly vertical, then the triangle can be considered as "y-major" and "x-minor".

In one embodiment the method moves from an 'x,y' coordinate system to a 'major,minor' coordinate system to effectively remove take the direction out of the calculations. As described above, this effectively takes the orientation of the triangle out of the accumulation calculations, simplifying the calculations, reducing the total number of possible shapes, and improving performance. In this system, calculations become one level of abstraction from the original. For instance, the equation of a slope now would be: slope= delta in minor/delta in major; instead of slope=delta in y/delta in x. This results in the first accumulator always working on the major edge of the triangle, regardless of orientation, and the second accumulator always works on the spans or slices in the direction perpendicular to the major orientation of the triangle.

In one embodiment, this method is used on all the of primitives (two and three dimensional) that are accelerated in hardware. In one embodiment, situations in which the method does not matter, (e.g., rectangles and points/dots) the primitive is orthogonal and a default is picked of either always x-major or always y-major, although this choice does not matter. In another embodiment, this method is only used on triangle primitives. Also, although embodiments of the invention are described herein operating on triangles, it is noted that concepts described herein may readily be applied to other types of geometric primitives or polygons, such as NURBs (Non-Uniform Rational B-Splines), other splines, sub-division surfaces, voxels (volume elements) and other types of data. Thus, embodiments of the invention which operate on various other types of polygons or geometric primitives are contemplated.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for rendering a plurality of triangles in a graphics system, wherein, for each of the triangles, the method comprises: receiving information corresponding to the vertices of the triangle; computing a horizontal delta dx and a vertical delta dy for each edge of the triangle based on the received information; computing a major delta dM for each edge as the larger of the corresponding horizontal delta dx and vertical delta dy; determining a controlling edge of the triangle as the edge that attains the largest of the major deltas dM of the edges; determining a major axis of the triangle, wherein the major axis is the horizontal axis if the horizontal delta of the controlling edge is the major delta dM of the controlling edge, wherein the major axis is the vertical axis if the vertical delta of the controlling edge is the major delta dM of the controlling edge; generating start points on the controlling edge and corresponding end points on at least one complementary edge of the triangle, wherein each start point and corresponding end point defines a corresponding span, wherein said generating start points and end points operates in a direction of the major axis, wherein each span is oriented in a direction perpendicular to the major axis; identifying pixel locations in the spans based on the corresponding start points and end points; wherein said generating and identifying are performed in a pipelined fashion.

2. The method of claim 1, wherein said generating start points and end points in the direction of the major axis and said identifying pixel locations in the spans oriented in the direction perpendicular to the major axis balances a load associated with said generating and a load associated with said identifying.

3. The method of claim 1, wherein said generating start points and end points comprises performing an edge walking process on the major edge of the triangle and said at least one complementary edge; wherein said identifying pixel locations in the spans of the triangle comprises performing a span walking process on the spans of the triangle.

4. The method of claim 3, wherein said edge walking and said span walking are performed at least partially concurrently.

5. The method of claim 3, further comprising:

storing information regarding the major axis;

mapping coordinates of the triangle to a major-minor coordinate system defined by the major axis and a minor axis perpendicular to the major axis.

6. The method of claim 5, further comprising:

mapping the coordinates of the triangle back to an original coordinate system defined by the horizontal axis and the vertical axis, after said generating and identifying, based on said stored information regarding the major axis.

7. The method of claim 1, further comprising:

interpolating parameter values corresponding to said pixel locations in the spans; and generating pixels corresponding to said pixel locations based on the parameter values.

8. The method of claim 1, wherein the plurality of triangles correspond to an image to be rendered on a display, and wherein the method is performed for each one of the plurality of triangles.

9. The method of claim 1, wherein said generating is performed by a first set of one or more accumulators, wherein said identifying is performed by a second set of one or more accumulators.

10. A graphics system comprising:

means for receiving information corresponding to the vertices of a plurality of triangles;

means for computing a horizontal delta dx and a vertical delta dy for each edge of each triangle of said plurality based on the received information;

means for computing a major delta dM for each edge as the larger of the corresponding horizontal delta dx and vertical delta dy;

means for determining a controlling edge of the triangle as the edge that attains the largest of the major deltas dM of the edges;

means for determining a major axis of the triangle, wherein the major axis is the horizontal axis if the horizontal delta of the controlling edge is the major delta dM of the controlling edge, wherein the major axis is the vertical axis if the vertical delta of the controlling edge is the major delta dM of the controlling edge;

an edge walker configured to generate start points on the controlling edge and corresponding end points on at least one complementary edge of the triangle, wherein each start point and corresponding end point defines a corresponding span, wherein said generating start points and end points operates in a direction of the major axis, wherein each span is oriented in a direction perpendicular to the major axis;

a span walker configured to identify pixel locations in the spans based on the corresponding start points and end points; wherein said edge walker and said span walker operate in a pipelined fashion.

11. The system of claim 10, wherein said generating start points and end points in the direction of the major axis and said identifying pixel locations in the spans oriented in the direction perpendicular to the major axis balances a load associated with said edge walker and a load associated with said span walker.

12. The system of claim 10, wherein said edge walker and said span walker operate at least partially concurrently.

13. The system of claim 10, further comprising:

means for storing information regarding the major axis;

means for mapping coordinates of the triangle to a major-minor coordinate system defined by the major axis and a minor axis perpendicular to the major axis.

14. The system of claim 13, further comprising:

means for mapping the coordinates of the triangle back to an original coordinate system defined by the horizontal axis and the vertical axis, after said generating and said identifying, based on said stored information regarding the major axis.

15. The system of claim 10, further comprising:

means for interpolating parameter values corresponding to said pixel locations in the spans; and means for generating pixels corresponding to said pixel locations based on the parameter values.

16. The system of claim 10, wherein the plurality of triangles correspond to an image to be rendered on a display.

17. The system of claim 10, wherein said edge walker includes a first set of one or more accumulators, wherein said span walker includes a second set of one or more accumulators.

18. The system of claim 10, further comprising:

means for computing one or more samples at sample positions interior to the triangle corresponding to a neighborhood of each pixel location;

means for storing the samples in a sample storage area in a frame buffer;

means for reading and filtering the samples from the sample storage area to generate pixels;

means for storing the pixels in a pixel storage area of the frame buffer;

means for reading the pixels from the frame buffer and generating a video signal from said pixels;

means for supplying the video signal to a display device.

* * * * *